UNITED STATES PATENT OFFICE.

CHARLES M. TAYLOR, JR., OF PHILADELPHIA, PENNSYLVANIA.

BUTTER-MAKING.

SPECIFICATION forming part of Letters Patent No. 668,721, dated February 26, 1901.

Application filed June 7, 1900. Serial No. 19,440. (No specimens.)

*To all whom it may concern:*

Be it known that I, CHARLES M. TAYLOR, Jr., a citizen of the United States, residing at the city of Philadelphia, in the county of Philadelphia and State of Pennsylvania, have invented certain new and useful Improvements in Butter-Making, of which the following is a specification.

The object of the present invention is to provide an expeditious, cleanly, and easy method of obtaining butter from cream.

To these and other ends hereinafter set forth the invention, stated in general terms, consists in the separation of the fatty or buttery constituents of cream from the watery or non-fatty constituents thereof by absorption of the latter and of the subsequent recovery of the buttery constituents.

To practice my invention, ordinary cream is poured onto an absorbent substance, as blotting-paper, so as to form a layer of cream. A thickness of three millimeters is productive of very rapid results. A greater thickness takes more time; but I do not intend to limit myself to any specific thickness, but merely to differentiate from a vessel or jar. Within a very short time—for example, four or five minutes—the watery or non-fatty constituents of the cream are absorbed by the substance, such as blotting-paper, and the fatty constitnents or butter remain as a layer upon the surface of the paper or its equivalent. Thus the separation is effected by the absorption of the watery or non-fatty constituents which are taken up into the body of the absorbent substance, leaving the butter on the surface thereof. Subsequently the layer of butter is removed from the absorbent substance.

The advantages of the described invention are obvious; but I may point out that its practice obviates all necessity for churning or for the expenditure of energy in like operations, which are slow and expensive. Moreover, for household uses it permits of the production in an easy way of pure butter, so that substances, as oleomargarin, may be absolutely guarded against. Furthermore, the butter produced is what is called "fresh," meaning that it is free from salt, which is ordinarily added to keep it, and fresh butter is desired by many people. The process also permits of making largely-increased quantities of butter from a given quantity of cream.

It will be obvious to those skilled in the art to which my invention appertains that modifications may be made in detail without departing from the spirit thereof. Hence I do not limit myself to the precise mode of procedure herein set forth; but,

Having thus described the nature and objects of my invention, what I claim as new, and desire to secure by Letters Patent, is—

1. The method of making butter which consists in spreading cream upon absorbent material and permitting the latter to absorb the non-fatty constituents and leave the butter upon its surface, and collecting the butter from said surface, substantially as described.

2. The process of making butter which consists in spreading a layer of cream upon a sheet of blotting-paper and permitting the latter to absorb the non-fatty constituents and thus form a surface layer of butter, and then collecting the layer of butter from the surface of the paper, substantially as described.

In testimony whereof I have hereunto signed my name.

CHAS. M. TAYLOR, JR.

In presence of—
W. J. JACKSON,
K. M. GILLIGAN.